United States Patent
Hussain et al.

(10) Patent No.: US 9,706,564 B2
(45) Date of Patent: Jul. 11, 2017

(54) APPARATUS AND METHOD FOR MEDIA ACCESS CONTROL SCHEDULING WITH A PRIORITY CALCULATION HARDWARE COPROCESSOR

(71) Applicant: Cavium, Inc., San Jose, CA (US)

(72) Inventors: Muhammad Raghib Hussain, Saratoga, CA (US); Vishal Murgai, Cupertino, CA (US)

(73) Assignee: Cavium, Inc., San Jose, CA (US)

( * ) Notice: Subject to any disclaimer, the term of this patent is extended or adjusted under 35 U.S.C. 154(b) by 256 days.

(21) Appl. No.: 13/830,492

(22) Filed: Mar. 14, 2013

(65) Prior Publication Data

US 2014/0269530 A1    Sep. 18, 2014

(51) Int. Cl.
*H04W 72/12* (2009.01)
*H04L 12/863* (2013.01)
*H04L 12/861* (2013.01)

(52) U.S. Cl.
CPC ....... *H04W 72/1247* (2013.01); *H04L 47/625* (2013.01); *H04W 72/1205* (2013.01); *H04L 49/9063* (2013.01)

(58) Field of Classification Search
CPC ... H04L 5/0053; H04L 5/0055; H04L 5/0035; H04L 65/4061; H04W 72/042; H04W 72/0413; H04W 72/082; H04W 72/085; H04W 72/08; H04W 24/10; H04W 28/24; H04W 4/10; H04W 76/005; H04W 4/08; H04W 4/06
USPC ....... 370/329, 330; 455/452.2, 518; 718/102
See application file for complete search history.

(56) References Cited

U.S. PATENT DOCUMENTS

| | | |
|---|---|---|
| 5,193,207 A | 3/1993 | Vander Vegt et al. |
| 6,175,554 B1 | 1/2001 | Jang et al. |
| 6,466,976 B1 | 10/2002 | Alles et al. |
| 6,665,752 B1 | 12/2003 | Bernath et al. |
| 6,721,797 B1 | 4/2004 | Kim |
| 6,845,389 B1 | 1/2005 | Sen et al. |
| 7,035,277 B1 | 4/2006 | Batcher |
| 7,080,400 B1 | 7/2006 | Navar |
| 7,698,366 B2 | 4/2010 | Schofield et al. |
| 8,266,150 B1 | 9/2012 | Lin et al. |
| 2002/0097695 A1* | 7/2002 | Herrmann ........... H04W 28/065 370/329 |
| 2002/0191592 A1 | 12/2002 | Rogers et al. |
| 2003/0035371 A1 | 2/2003 | Reed et al. |
| 2003/0037117 A1 | 2/2003 | Tabuchi |
| 2003/0063562 A1 | 4/2003 | Sarkinen et al. |
| 2003/0067903 A1 | 4/2003 | Jorgensen |
| 2003/0081611 A1 | 5/2003 | Goetzinger et al. |
| 2003/0096617 A1 | 5/2003 | Miller, II et al. |
| 2003/0161340 A1 | 8/2003 | Sherman |
| 2004/0158646 A1 | 8/2004 | Miernik et al. |
| 2005/0135312 A1 | 6/2005 | Montojo et al. |
| 2007/0121542 A1 | 5/2007 | Lohr et al. |
| 2008/0046266 A1 | 2/2008 | Gudipalley et al. |

(Continued)

*Primary Examiner* — Joshua Kading
*Assistant Examiner* — Atique Ahmed
(74) *Attorney, Agent, or Firm* — Cooley LLP

(57) ABSTRACT

An apparatus includes a Media Access Control (MAC) scheduler to generate a priority value calculation request with a specified formula and a list of metrics. A hardware based priority value calculation coprocessor services the priority value calculation request in accordance with the specified formula and the list of metrics.

17 Claims, 3 Drawing Sheets

(56) References Cited

U.S. PATENT DOCUMENTS

| | | |
|---|---|---|
| 2008/0065442 A1 | 3/2008 | Bayet et al. |
| 2008/0198814 A1* | 8/2008 | Wengerter .............. H04L 47/14 370/336 |
| 2009/0044189 A1 | 2/2009 | Mutlu et al. |
| 2009/0103438 A1 | 4/2009 | Groh et al. |
| 2009/0138670 A1 | 5/2009 | Mutlu et al. |
| 2009/0175226 A1 | 7/2009 | Ren et al. |
| 2010/0128614 A1* | 5/2010 | Kuusela ............. H04L 12/5695 370/252 |
| 2010/0248771 A1* | 9/2010 | Brewer ................ H04W 72/10 455/518 |
| 2010/0281483 A1* | 11/2010 | Rakib ................... G06F 9/3009 718/102 |
| 2010/0306460 A1 | 12/2010 | Hara |
| 2011/0179240 A1 | 7/2011 | Sukonik et al. |
| 2011/0296117 A1 | 12/2011 | Fukuda et al. |
| 2012/0202513 A1* | 8/2012 | Ericson ................ H04L 5/0007 455/452.2 |
| 2013/0003680 A1* | 1/2013 | Yamamoto et al. .......... 370/329 |
| 2013/0044028 A1 | 2/2013 | Lea et al. |
| 2013/0189994 A1 | 7/2013 | Maehara et al. |
| 2014/0036859 A1* | 2/2014 | Ekpenyong ......... H04W 72/042 370/330 |

* cited by examiner

_US 9,706,564 B2_

APPARATUS AND METHOD FOR MEDIA ACCESS CONTROL SCHEDULING WITH A PRIORITY CALCULATION HARDWARE COPROCESSOR

FIELD OF THE INVENTION

This invention relates generally to mobile wireless communication systems. More particularly, this invention relates to a mobile wireless communication node with media access control scheduling utilizing a priority calculation hardware coprocessor.

BACKGROUND OF THE INVENTION

A mobile wireless communication system processes packet data to satisfy specified quality of service parameters. The quality of service parameters may include bit error rate, packet latency, service response time, packet loss rate, signal-to-noise ratio and the like. Prioritizing packet transfers is a complex and critical task. Accordingly, there is a need to improve existing techniques for prioritizing traffic in mobile wireless communication systems.

SUMMARY OF THE INVENTION

An apparatus includes a Media Access Control (MAC) scheduler to generate a priority calculation request for different User Equipment (UE) with various priority value computation parameters (e.g., various metrics and a formula). A hardware based priority calculation coprocessor uses the priority value computation parameters to compute a single priority value for each UE.

A network node includes Layer-1 functional blocks and Layer-2 functional blocks that include a Media Access Control (MAC) scheduler program executed on a processor to generate a priority calculation request with priority value computation parameters (e.g., various metrics and a formula). A hardware based priority calculation coprocessor calculates a priority value. For example, a specified formula and various metrics (e.g., quality of service, time waiting in the queue, channel quality, etc.) may be used to compute the priority value. A set of priority values may be computed for a set of mobile devices.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
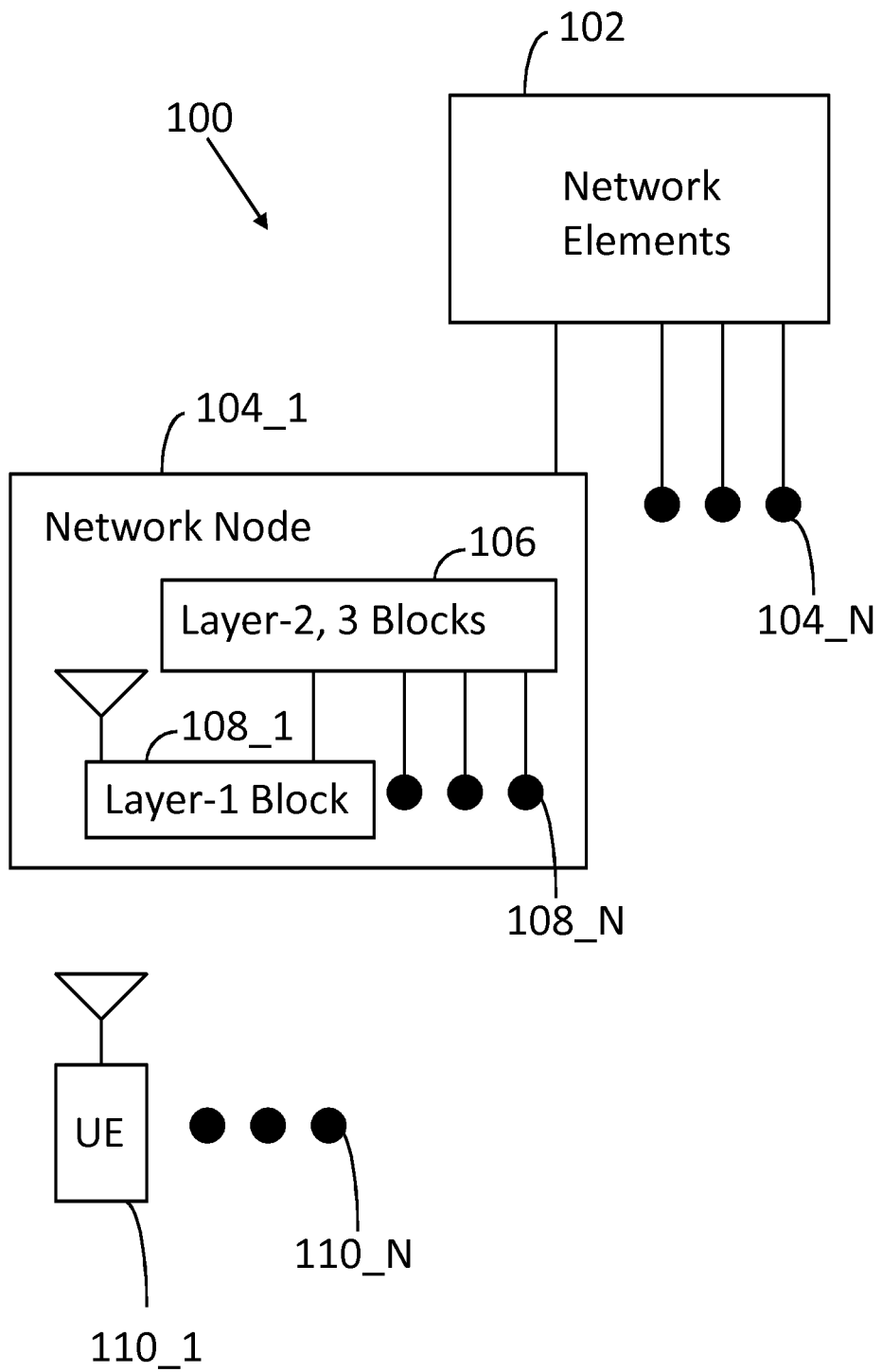
FIG. 1 illustrates a system configured in accordance with an embodiment of the invention.

FIG. 1 illustrates a system 100 configured in accordance with an embodiment of the invention. The system 100 includes network elements 102, which coordinate communications for a set of network nodes 104_1 through 104_N. By way of example, the network elements 102 may include Mobility Management Entities (MMEs), Serving Gateways (S-GWs), Packet Data Network Gateways (P-GWs) and the like. The network node 104 may be hardware that is connected to a mobile phone network to communicate directly with user equipment 110_1 through 110_N (e.g., mobile handsets).

The network node 104 may be an Evolved Node B (also referred to as eNB, eNodeB or E-UTRAN Node B). Evolved Node B is the element in the Evolved Universal Terrestrial Radio Access (E-UTRA) of Long Term Evolution (LTE) that is the evolution of the element Node B in Universal Terrestrial Radio Access (UTRA) of the Universal Mobile Telecommunications System (UMTS). Evolved Node B is the hardware that is connected to the mobile phone network that communicates directly with mobile handsets (e.g., UEs 110), like a base transceiver station (BTS) in GSM networks. Traditionally, a Node B has minimum functionality, and is controlled by a Radio Network Controller (RNC). However, with an eNodeB, there is no separate controller element. This simplifies the architecture and allows lower response times.

Node 104 includes Layer-2 and Layer-3 functional blocks 106. These blocks may include Packet Data Convergence Protocol (PDCP) blocks, Radio Link Control (RLC) blocks, MAC blocks and the like. Functional blocks 106 communicate with Layer-1 blocks 108_1 through 108_N. The Layer-1 blocks are Layer-1 physical layer functional blocks that communicate with the user equipment (e.g., mobile devices) 110_1 through 110_N. The Layer-1 blocks establish a duplex communication path (e.g., frequency division duplex communications or time division duplex communications) with user equipment. The communication path is a packet channel, where each packet may have speech, data, picture or video information.

Figure 2:
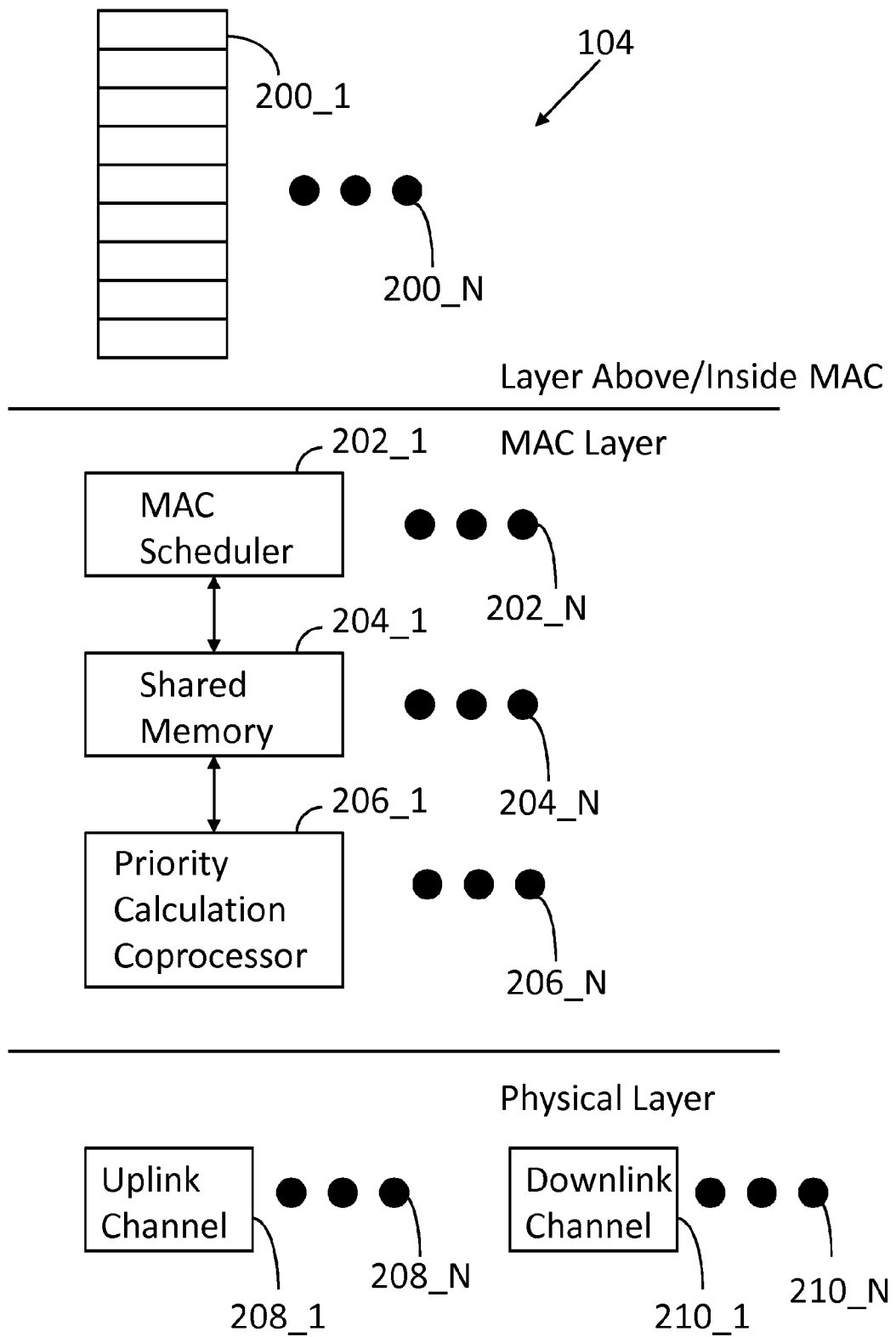
FIG. 2 illustrates a node configured in accordance with an embodiment of the invention.

FIG. 2 is a more detailed characterization of a node 104 configured in accordance with an embodiment of the invention. The node includes a number of queues 200_1 through 200_N for storing packet communications. The queues 200 reside above or at the media access layer (e.g., network layer, transport layer).

The media access layer includes MAC schedulers 202_1 through 202_N. Each MAC scheduler 202 is a software process or thread executing on a processor. Shared memories 204_1 through 204_N and priority calculation coprocessors (PCC) 206_1 through 206_N also reside at the MAC layer. The priority calculation coprocessors are hardware devices.

Each MAC scheduler 202 generates requests for a PCC unit 206. In one embodiment, the MAC scheduler 202 submits request(s) to a PCC unit 206 in the form of an array of metrics for different UEs, along with a formula to be applied to each metric array for each UE. The metrics may include quality of service for a UE, channel conditions, wait-in-queue packet retransmission status and the like. A MAC scheduler 202 may write the request to shared memory 204. A PPC unit 206 may read the request from shared memory 204. The PPC unit 206 performs arithmetic operations on the metrics to produce a priority value.

The MAC scheduler 202 retrieves priority values for different UEs, loads them into a media access control block and executes a scheduling algorithm. The MAC scheduler 202 may optionally submit the list of UEs to a hardware sort coprocessor in order to arrange the priority values in either ascending or descending order of priority value. That is, the priority calculation coprocessor 206 may be implemented with a hardware sort coprocessor implemented in the same silicon so that the hardware performs a priority calculation followed by a sort calculation.

A MAC scheduler 202 applies a media access control block to one of the downlink channels 210_1 through 210_N or uplink channels 208_1 through 208_N of the physical layer.

Figure 3:
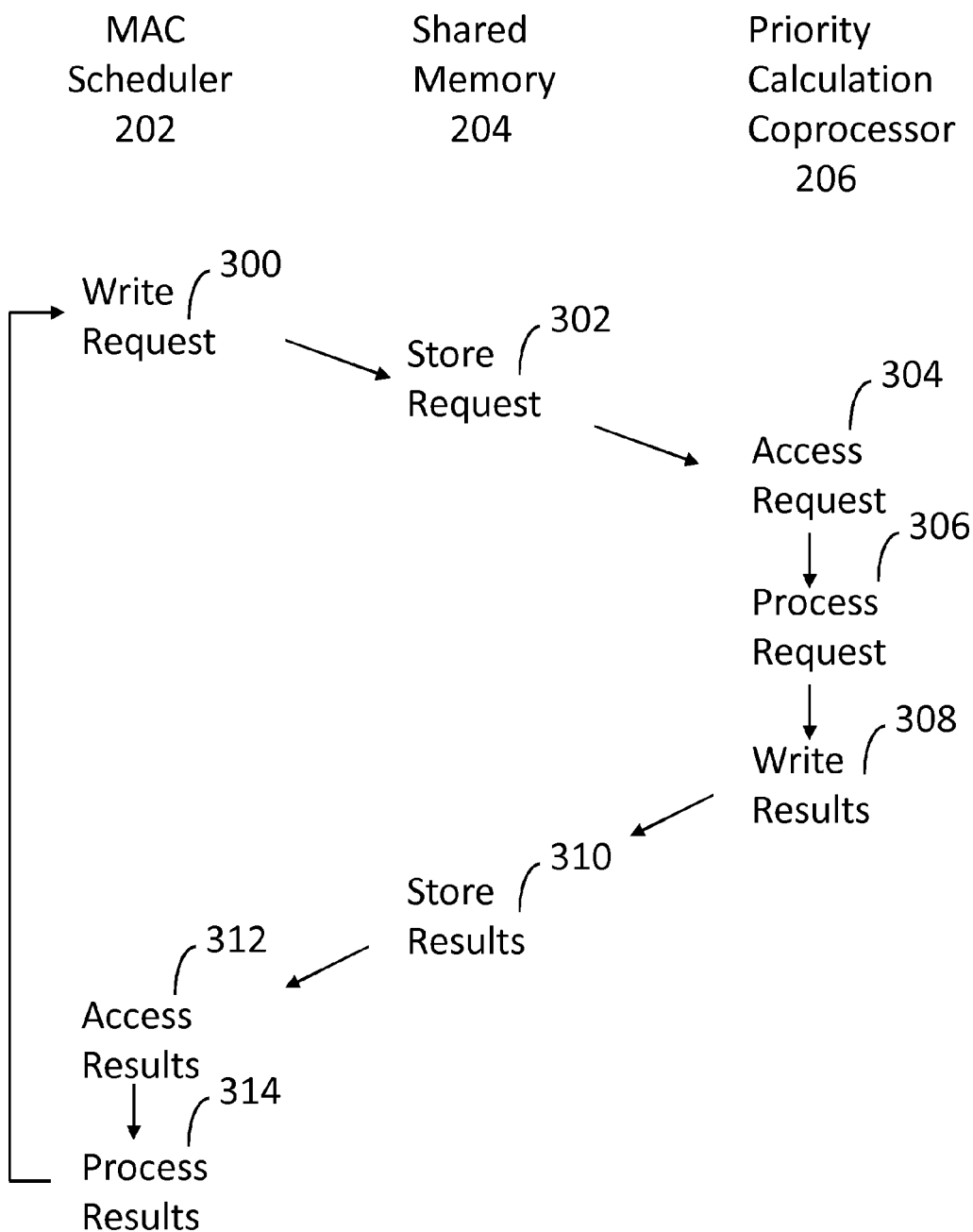
FIG. 3 illustrates processing operations performed in accordance with an embodiment of the invention.

FIG. 3 illustrates processing operations associated with an embodiment of the invention. In particular, the figure illustrates interactions between the MAC scheduler 202, shared memory 204 and priority calculation coprocessor 206. In one embodiment, the MAC scheduler processor 202 writes a request 300 to shared memory 204, which stores the request 302. The request is a priority calculation request with various priority value computation parameters, such as various metrics and a formula. The priority calculation coprocessor 206 accesses the request 304, processes the request 306 and writes results 308. The priority calculation coprocessor is a hardware resource configured to do arithmetic operations on priority parameters, such as channel conditions, wait-in-queue time, timing efficiency and the like. It uses a formula specified in the request to combine these different parameters to compute a single value (which could be a floating point or integer value).

The shared memory 204 stores the calculated list of priority values for different UEs as results 310. The MAC scheduler 202 accesses the results 312 and processes the results 314. The priority calculation coprocessor 206 may use a zero byte write to a specified location in shared memory 204 or use an interrupt to advise the MAC scheduler 202 of available results. Processing of the results may include loading the results into a media access control block that is assigned to a downlink channel 210. Control then returns to block 300.

The operations of the invention have been fully disclosed. The following disclosure relates to specific implementation details that may be utilized in accordance with certain embodiments of the invention. Each MAC scheduler 202 allocates down link and up link radio resources to each mobile device based upon quality of service requirements. The priority of each user device may be a function of time (e.g., the longer it waits in a queue 200 the higher its priority for the next scheduling iteration). For a given quality of service level, the MAC scheduler 202 searches the list of user devices waiting for air resources and tries to find the best suitable candidates for allocation of radio resources. Thus, priority calculation, sorting and selecting operations are repeatedly performed (e.g., every 1 msec). Candidates are selected based upon priority, which may be a weighted average of several constantly changing metrics (e.g., quality of service, channel conditions, wait-in-queue, etc.).

Those skilled in the art will appreciate that media access control scheduling is a critical function performed by base stations. The priority calculation coprocessor 206 helps improve MAC scheduler performance. This facilitates the utilization of a lower number of processor (cores) required for MAC scheduler operation.

The priority value computation parameters may include any number of software specified parameters, such as a formula and a list of metrics. The list of metrics may be quality of service parameters, such as bit error rate, packet latency, service response time, packet loss, signal-to-noise ratio and the like. Metrics may also include channel conditions, wait-in-queue time, timing efficiency and the like.

An application program interface may be used to pass the priority value computation parameters. The following documented code is an example of an application program interface that may be used in accordance with an embodiment of the invention.

```
typedef octeon_priority_calc          /*Octeon refers to a processor sold by
                                        Cavium Networks, Inc.*/
{
  uint8_t metric_1 [4] ;
  uint8_t metric_2 [4];
  uint8_t metric_3 [4];
  uint8_t metric_3 [4];
  ...
  uint8_t context_pointer[8];
} OCTEON_PRIORITY_CALC_T;
typedef octeon_priority_calc_instruction
    {
      Uint8 data_type;      /* float or integer */
      Uint8 num_metrics; /* number of metrics passed to hardware unit */
      Uint8 response_type  /* how unit notifies software cores about completion:
                              WQE, zero-byte write, continue w/ sort/search */
      uint32 address;          /* WQE pointer or address to do zero-byte write */
      uint32 response_address; /* starting address location where hardware unit writes
                                  results to */
      uint32 formula;
} OCTEON_PRIORITY_CALC_INSTRUCTION_T;
int octeon_priority_calc_submit (
        OCTEON_PRIORITY_CALC_T *octeon_priority_calc_input_array,
        OCTEON_PRIORITY_CALC_INSTRUCTION_T *octeon_priority_calc_params);
octeon_priority_calc_input_array:    /*pointer to input array*/
OCTEON_PRIORITY_CALC_T list
Octeon_priority_calc_params:         /*various parameters for control, input and
                                        output info needed by PRIORITY_CALC engine*/
```

In the foregoing example, data type is specified (i.e., floating point or integer). The number of passed metrics is also specified. Various response parameters are also specified, such as response type and response address in shared memory. A formula for computing priority may also be passed.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
a shared memory separate from and accessible by each of a Media Access Control (MAC) scheduler and a hardware based priority value calculation coprocessor, wherein the MAC scheduler is a software process executing on a processor that generates a priority value calculation request with a specified formula and a list of metrics that is written to the shared memory, wherein the list of metrics includes priority parameters of channel conditions, wait-in-queue time and timing efficiency; and
the hardware based priority value calculation coprocessor is a hardware device separate from the processor that accesses the priority value calculation request from the shared memory and is operative to service the priority value calculation request by using the specified formula to combine the list of metrics to compute a single priority value that is written to the shared memory for processing by the MAC scheduler.

2. The apparatus of claim 1 in combination with a mobile wireless communication system.

3. The apparatus of claim 1 wherein the MAC scheduler processes a list of priority values for different mobile devices to produce down link channel communications.

4. The apparatus of claim 3 wherein the MAC scheduler sorts the list of priority values for the different mobile devices and selects mobile devices for down link channel communications.

5. The apparatus of claim 1 wherein the hardware based priority calculation coprocessor includes a hardware sort coprocessor to perform a priority value sort calculation for a mobile wireless communication system.

6. The apparatus of claim 1 wherein the priority calculation coprocessor writes an unsorted array of priorities to the shared memory and the MAC scheduler reads the unsorted array of priorities from the shared memory.

7. A network node, comprising:
Layer-1 functional blocks; and
Layer-2 functional blocks including
a shared memory separate from and accessible by each of a Media Access Control (MAC) scheduler and a hardware based priority value calculation coprocessor, wherein the MAC scheduler is a program executed on a processor that generates a priority calculation request with priority value computation parameters that is written to the shared memory, wherein the priority value computation parameters include a priority calculation formula and a list of metrics including priority parameters of channel conditions, wait-in-queue time and timing efficiency, and
the hardware based priority calculation coprocessor is a hardware device separate from the processor that accesses the priority calculation request from the shared memory and is operative to service the priority calculation request by using the priority calculation formula to combine the list of metrics to compute a single value that is written to the shared memory for processing by the MAC scheduler.

8. The network node of claim 7 wherein the priority calculation coprocessor accesses a queue.

9. The network node of claim 7 wherein the MAC scheduler processes a priority array to produce media access control blocks.

10. The network node of claim 7 wherein the hardware based priority calculation coprocessor includes a hardware sort coprocessor to perform a priority value sort calculation.

11. The network node of claim 7 wherein the hardware based priority calculation coprocessor writes a computed array of user equipment priority parameters to the shared memory and the MAC scheduler reads the computed array from the shared memory.

12. An apparatus, comprising:
a hardware based priority value calculation coprocessor configured to
access a priority value calculation request from a shared memory, wherein the priority value calculation request includes a specified formula and a list of metrics including priority parameters of channel conditions, wait-in-queue time and timing efficiency,
service the priority value calculation request in accordance with the specified formula to combine the list of metrics to compute a single priority value, and
write the single priority value to the shared memory for processing by a Media Access Control (MAC) scheduler implemented as a software process executing on a processor separate from the hardware based priority value calculation coprocessor.

13. The apparatus of claim 12 in combination with a mobile wireless communication system.

14. The apparatus of claim 12 in combination with a Media Access Control (MAC) scheduler that writes the priority value calculation request to the shared memory, and wherein the MAC scheduler processes a list of priority values for different mobile devices to produce down link channel communications.

15. The apparatus of claim 14 wherein the MAC scheduler sorts the list of priority values for the different mobile devices and selects mobile devices for down link channel communications.

16. The apparatus of claim 12 wherein the hardware based priority calculation coprocessor includes a hardware sort coprocessor to perform a priority value sort calculation for a mobile wireless communication system.

17. The apparatus of claim 12 wherein the priority calculation coprocessor writes an unsorted array of priorities to the shared memory and the MAC scheduler reads the unsorted array of priorities from the shared memory.

* * * * *